Feb. 7, 1928.

C. F. RICE 1,658,352

STABILIZER FOR AUTOMOBILES

Filed May 24, 1927

Inventor

Charles F. Rice.

By *[signature]*

Attorney

Patented Feb. 7, 1928.

1,658,352

UNITED STATES PATENT OFFICE.

CHARLES F. RICE, OF ENGLEWOOD, COLORADO.

STABILIZER FOR AUTOMOBILES.

Application filed May 24, 1927. Serial No. 193,858.

This invention relates to improvements in stabilizers for automobiles.

Automobiles are often driven at high speeds and it is evident that the position of the front wheels, by means of which the guiding is accomplished, must be very carefully controlled. It is especially necessary that the wheels shall automatically adjust themselves so that the automobile will travel in a straight line unless the driver applies a force which moves them out of such straight line position.

It is the object of this invention to produce a simple mechanism that can readily be applied to the steering gear and which will exert a force tending to hold the parts in a central position so that the automobile, when in motion, will travel in a straight line, but which will offer no appreciable resistance to the steering of the automobile when going around curves.

It is a further object of this invention to produce a device which, in addition to stabilizing the steering mechanism, will also prevent rattling when the steering gear becomes worn.

The above and other objects that may become apparent as the description proceeds are attained by means of a construction and an arrangement of parts that I will now proceed to describe in detail, reference for this purpose being had to the accompanying drawing in which the preferred embodiment has been illustrated and in which.

Figure 1:
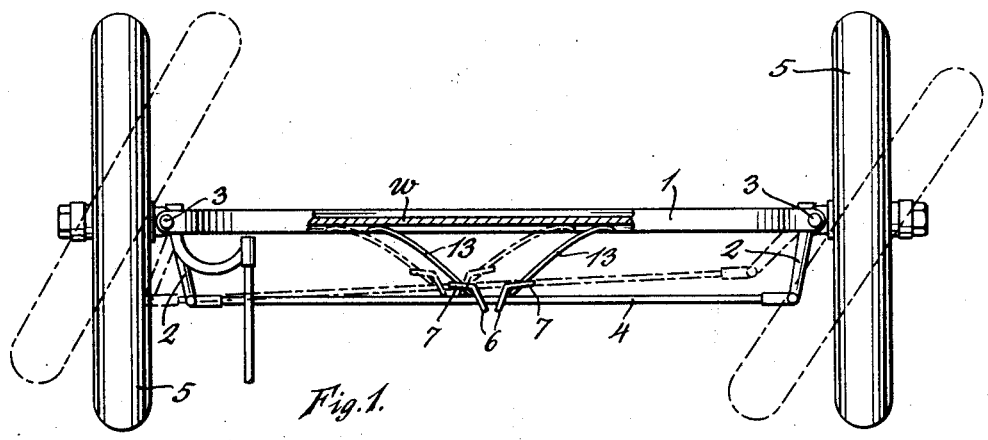
Fig. 1 is a plan view looking down upon a front axle and associated steering gear and shows my stabilizers in place.

Numeral 1 represents the front axle of an automobile to the ends of which the spindle arms 2 are pivotally connected by means of bolts 3. The spindle arms have their free ends joined by a connecting rod 4. Wheels 5 are connected to the spindles in the usual manner. The front axle of practically all cars are of I beam construction and have an upper and a lower flange connected by means of a web "$w$". When the wheels are turned, as when rounding a corner, the spindle arm connecting rod moves transversely and also comes closer to the axle until it reaches a position like that shown by dot and dash lines in Fig. 1.

Figure 2:
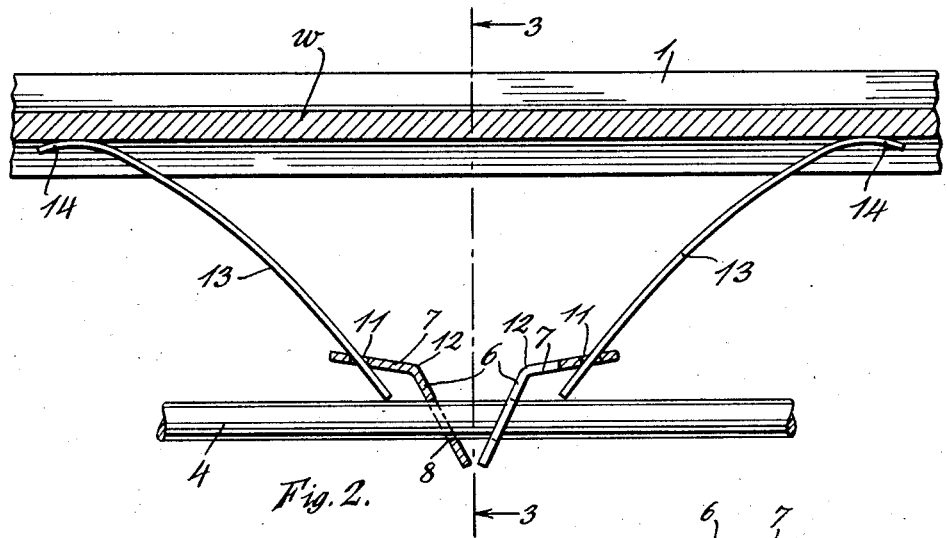
Fig. 2 is a view similar to that of Fig. 1 and shows the parts to a somewhat larger scale.
Figure 3:
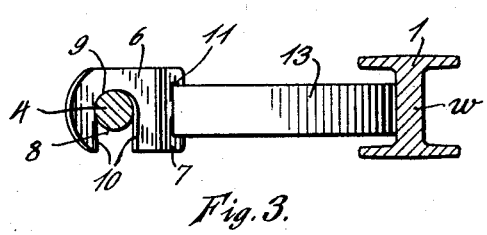
Fig. 3 is a section taken on line 3—3, Fig. 2.
Figure 4:
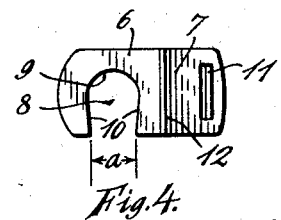
Fig. 4 is a side elevation of one of the attaching members.

My stabilizer consists of a steel plate having two angularly related portions 6 and 7. Portions 6 have notches 8 that open on one side. The width of these notches, where they open through the side, is somewhat less than the diameter of the curved portion 9 and therefore the straight sides 10, which are tangent to the curved edge 9, are inclined with respect to each other. The distance "$a$" (Fig. 4) is slightly greater than the diameter of rod 4, whereas the curved portion 9 is also slightly larger in diameter than the rod. When the rod 4 is introduced into the notches 8, the part 6 can be inclined slightly with respect to the perpendicular plane of rod 4 (Fig. 2). The sharp edges of the notch will cut into the surface of the softer material of rod 4 and hold the plate from longitudinal movement on the rod. Portions 7 of the plates are provided with a transverse slot whose two sides are parallel with each other and with the line 12 which represents the vertex of the angle between sides 6 and 7. Springs 13 are made from flat bars of spring steel and are normally straight except for the curved end 14 which lies against the rear surface of the web of the axle. The angle between portions 6 and 7 are such that when the parts are assembled in the manner shown in Fig. 2, the springs will be put under considerable strain. It will be observed that I have shown two anchoring plates and two springs. The anchoring plates are identical except that the notches 8 are reversed. A single spring and a single anchoring plate may be used and it is likewise possible to employ a greater number than that shown.

When the steering gear is moved from central position, the spring tips 14 will slide on the web, and the springs will likewise be bent an amount corresponding to the angular movement of the front wheels. The tension exerted by the springs tends to move the steering gear back to normal position and the friction of tips 14 against the surface of flange W as well as the resistance offered by the springs tends to hold the parts in central position.

I desire to call attention to the great simplicity of my device and to the fact that it can be applied almost instantly and without the aid of tools of any kind. The attaching plates, aside from the reversal of the notches, are identical and the springs are also identical which simplifies the manufacture.

Having described my invention what I claim as new is:

A stabilizer for automobile steering gears comprising an attaching device having two angularly related portions, one of which has a narrow opening extending transversely and the other of which has a notch opening on one side, and a spring having one end inserted into the narrow opening.

In testimony whereof I affix my signature.

CHARLES F. RICE.